US005537830A

United States Patent [19]
Goshaw et al.

[11] Patent Number: 5,537,830
[45] Date of Patent: Jul. 23, 1996

[54] CONTROL METHOD AND APPARTUS FOR A CENTRIFUGAL CHILLER USING A VARIABLE SPEED IMPELLER MOTOR DRIVE

[75] Inventors: Craig M. Goshaw; Brian T. Sullivan; Paul C. Rentmeester, all of La Crosse, Wis.

[73] Assignee: American Standard Inc., Piscataway, N.J.

[21] Appl. No.: 345,149

[22] Filed: Nov. 28, 1994

[51] Int. Cl.⁶ .................................................. F25D 17/02
[52] U.S. Cl. ............................. 62/201; 62/217; 62/228.4
[58] Field of Search ........................ 62/201, 217, 228.4, 62/228.5, 203, 204, 185, 228.1, 226, 227

[56] References Cited

U.S. PATENT DOCUMENTS

| | | | |
|---|---|---|---|
| 2,955,743 | 10/1960 | Kusama et al. ........................... 230/19 |
| 2,983,111 | 5/1961 | Miner et al. ...................... 62/228.4 X |
| 3,853,433 | 12/1974 | Roberts et al. ........................ 417/423 |
| 4,081,971 | 4/1978 | Eber ........................................ 62/216 |
| 4,151,725 | 5/1979 | Kountz et al. ........................... 62/182 |
| 4,177,649 | 12/1979 | Venema .................................... 62/209 |
| 4,223,537 | 9/1980 | Sanborn et al. ......................... 62/174 |
| 4,275,987 | 6/1981 | Kountz et al. ........................... 415/17 |
| 4,282,718 | 8/1981 | Kountz et al. ........................... 62/115 |
| 4,282,719 | 8/1981 | Kountz et al. ........................... 62/115 |
| 4,355,948 | 10/1982 | Kountz et al. ............................. 415/1 |
| 4,432,212 | 2/1984 | Tachibana et al. ...................... 62/229 |
| 4,464,720 | 8/1984 | Agarwal ................................. 364/431 |
| 4,514,991 | 5/1985 | Zinsmeyer ............................... 62/209 |
| 4,546,618 | 10/1985 | Kountz et al. ........................... 62/201 |
| 4,562,531 | 12/1985 | Enterline et al. ....................... 364/164 |
| 4,581,900 | 4/1986 | Lowe et al. .............................. 62/228 |
| 4,586,870 | 5/1986 | Hohlweg et al. ........................... 415/1 |
| 4,589,060 | 5/1986 | Zinsmeyer ............................. 364/148 |
| 4,608,833 | 9/1986 | Kountz .................................... 62/228 |
| 4,627,788 | 12/1986 | Keyes, IV et al. ....................... 415/11 |
| 4,640,665 | 2/1987 | Staroselsky et al. ...................... 415/1 |
| 4,646,534 | 3/1987 | Russell ................................... 62/228 |
| 4,656,589 | 4/1987 | Albers et al. .......................... 364/431 |
| 4,686,834 | 8/1987 | Haley et al. ............................. 62/209 |
| 4,689,967 | 9/1987 | Han et al. ................................ 62/201 |
| 4,949,276 | 8/1990 | Staroselsky et al. ................... 364/509 |
| 4,971,516 | 11/1990 | Lawless et al. ............................ 415/1 |
| 5,056,032 | 10/1991 | Swanson et al. ....................... 364/483 |
| 5,058,031 | 10/1991 | Swanson et al. ....................... 364/483 |
| 5,195,875 | 3/1993 | Gaston ................................... 417/282 |

*Primary Examiner*—Harry B. Tanner
*Attorney, Agent, or Firm*—William J. Beres; William O'Driscoll; Peter D. Ferguson

[57] ABSTRACT

A method of controlling the operation of a centrifugal compressor in a water chiller system. The compressor's capacity is variable by modulating its speed of rotation or by modulating its inlet guide vane's position. The water chiller includes an evaporator having a leaving water temperature. The method comprises the steps of: monitoring the leaving water temperature; determining if the leaving water temperature is in a steady state; modulating the compressor capacity by modulating speed of rotation if the leaving water temperature is in a steady state; and modulating the compressor capacity by modulating inlet guide vane position if the leaving water temperature is not in a steady state.

5 Claims, 6 Drawing Sheets

5,537,830

CONTROL METHOD AND APPARTUS FOR A CENTRIFUGAL CHILLER USING A VARIABLE SPEED IMPELLER MOTOR DRIVE

TECHNICAL FIELD

This invention relates generally to centrifugal chiller refrigeration systems. More particularly, it relates to a capacity control system for the variable speed impeller motor drive of a centrifugal chiller especially adapted for operating the chiller as efficiently as possible, but without risking operation of the chiller under surge conditions.

BACKGROUND OF THE INVENTION

Air conditioning systems typically incorporate the standard components of a refrigeration loop to provide chilled water for cooling a designated building space. A typical refrigeration loop includes a compressor to compress refrigerant gas, a condenser to condense the compressed refrigerant to a liquid, and an evaporator that utilizes the liquid refrigerant to cool water. The chilled water is then piped to the space to be cooled.

Air conditioning systems that utilize so called centrifugal compressors are referred to as centrifugal chillers. Centrifugal chillers typically range in size from 100 to 10,000 tons of refrigeration, and are recognized as providing certain advantages and efficiencies when used in large installations such as commercial buildings. The reliability of centrifugal chillers is high, and the maintenance requirements are low, because centrifugal compression involves the purely rotational motion of only a few mechanical parts.

A centrifugal compressor has an impeller that can be thought of as a fan with many fan blades. The impeller typically is surrounded by a duct. The refrigerant flow to the impeller is controlled by variable inlet vanes located in the duct at the inlet to the impeller. The inlet guide vanes operate at an angle to the direction of flow and cause the refrigerant flow to swirl just before entering the compressor impeller. The angle of the inlet guide vanes is variable with respect to the direction of refrigerant flow. As the angle of the inlet guide vanes is varied and the inlet guide vanes open and close, the refrigerant flow to the compressor is increased or decreased. In many applications, the inlet guide vanes are variable ninety degrees between a fully closed position perpendicular to the direction of the refrigerant flow to a fully open position in which the inlet guide vanes are aligned with the refrigerant flow. When the cooling load is high, the guide vanes are opened to increase the amount of refrigerant drawn through the evaporator, thereby increasing the operational cooling capacity of the chiller.

It is important to be able to vary the output capacity of an air conditioning system to meet all conditions of demand in the air conditioned space. At times of high cooling demand, the compressor will run at maximum load or full capacity. At other times the need for air conditioning is reduced and the compressor will run at a reduced capacity. The output of the air conditioning system then is substantially less than the output at full capacity. There is also a need to operate the compressor at the most efficient mode for the capacity that is required at any given time. This is required to reduce the electrical consumption of the air conditioning system to the lowest possible amount for the given load. The most efficient point of operation for a centrifugal compressor is very near a condition known as surge. Operation in the surge condition, however, is undesirable since it is very inefficient and can actually cause damage to the compressor.

In most centrifugal chillers, the compressor is driven by an electric induction motor, either directly or through speed-increasing gears. Because the optimum performance of a centrifugal compressor is strongly influenced by the rotating speed of the centrifugal compressor, much attention has been paid to systems to control the speed of the compressor induction motor speed is a function of the frequency of the power supplied to it. An inverter can vary the frequency of the power and thereby control motor speed.

The volume of refrigerant flow through a centrifugal compressor must be adjusted for changes in the load demanded by the air conditioning requirements of the space that is being cooled. Accordingly, a modulating capacity control system is a part of every centrifugal chiller. Control is typically accomplished by varying the inlet guide vanes and the impeller speed, either separately or in a coordinated manner.

The most common method of varying compressor speed is to vary the frequency of the alternating current that is supplied to the induction motor that drives the compressor. As previously indicated, variable-frequency inverters are used to modulate the motor speed.

Control of a centrifugal chiller is typically accomplished by monitoring the temperature of the chilled water as the water leaves the evaporator. The temperature of the water at that point is referred to as the Leaving Water Temperature. The Leaving Water Temperature is an industry wide accepted criteria tot establishing control of a centrifugal chiller. The set point of the Leaving Water Temperature, which is the desired operating temperature of the chilled water as the water leaves the evaporator, is selected by the user. U.S. Pat. No. 4,686,834 to Haley et al. is directed to a centrifugal compressor controller for minimizing power consumption while avoiding surge. This patent is assigned to the assignee of the present invention and is incorporated by reference herein.

As discussed above, centrifugal chillers are most efficient when operated near a condition known as surge. At surge, a point is reached where, for the desired cooling output, the pressure differential between the refrigerant immediately at the outlet of the impeller and the pressure of the refrigerant at the inlet of the impeller is large. In this condition, the refrigerant will surge, flowing first backward and then forward through the compressor. This is an unstable operating condition that must be avoided. It is desired to operate the impeller at a speed that is just great enough to avoid the compressor going into the surge condition. This is the lowest speed possible to maintain the compressor in a functional operating condition and meet the cooling requirements. Operating at any faster speed is not efficient from an energy consumption standpoint.

The operating configuration of the compressor which is most efficient for any given capacity is with the inlet guide vanes set to some maximum open position and the rotational speed of the impeller at the lowest possible speed that does not induce surge conditions. In the maximum open position, the variable inlet vanes may still be set at a slight angle with respect to the refrigerant flow direction so that swirl is still imparted to the refrigerant prior to entering the compressor or, alternatively, the vanes may be aligned with the direction of refrigerant flow. The rotational speed of the compressor impeller is controlled by utilizing an inverter that is capable of varying the frequency of the power being supplied to the motor that drives the impeller. Rotational speed of the motor is a direct function of the frequency of the power.

In the past a number of ideas have been advanced in an effort to control centrifugal compressors to achieve high efficiency and yet to avoid surge conditions. U.S. Pat. No. 4,608,833 to Kountz includes a learning mode which alternately incrementally lowers compressor speed and adjusts the position of the prerotational vanes. Once a surge is detected, a current surge surface array is updated and an operating mode is initiated. The initial surge surface array of Table II is generated using minimum Mach number together with a speed correction. However, storage of surge surface arrays for all relevant compressor operating conditions is memory intensive. It is also noted that this patent requires the measurement of actual motor speed.

U.S. Pat. No. 4,456,618 provides for continual measurement of prerotational vane position, compressor head, and suction flow to calculate an operating point for regulating both the inlet guide vanes and compressor speed. A microprocessor compares the operating point to a prestored surge surface generated by equations comparing compressor head to suction flow rate. If the calculated operating point is too far from the prestored surge surface, the system tries to move the operating point closer to the prestored condition. This system does not determine a region of actual surge based on actual surge events that occur to the specific compressor. It is also noted that this patent requires sensing a differential pressure across an orifice plate in a suction duct.

Another existing idea for compressor control is disclosed in U.S. Pat. No. 4,151,725. This method utilizes an inferred compressor head valve to define a control path. Surge avoidance is attempted by deriving a critical Mach number that is a function of compressor head and vane position. The compressor motor is then prevented from delivering an output that is below that critical Mach number. This system generates a surge curve from test data and develops equations to define an operating area that avoids the test surge area. This approach is limited in that it does not account for the actual surge events that occur to the specific compressor over time while functioning in the compressor's unique operating environment.

These methods and others have not proved satisfactory when implemented in the field. The surge point has a certain dynamic that is not accounted for in the previous control methods. Even identically designed compressors have varying surge points under identical operating conditions. Also, over time, the surge points in a given compressor change. Calculated fixed surge points and surge surfaces have not proved the answer to the most efficient operation. For such systems to routinely avoid surge, the operating point must be set artificially distant from the calculated surge conditions since the actual surge conditions unique to the specific compressor are not known. By so setting the operating point, a certain efficiency is sacrificed in the interest of avoiding surge.

U.S. Pat. No. 5,355,691 to Sullivan et al. solves many of the problems with previous systems. This patent has common inventors with the present invention, is assigned to the assignee of the present invention, and is hereby incorporated by reference. This patent established a dimensionless plot of possible points of compressor operation relating to a pressure coefficient and a capacity coefficient of the compressor. The capacity coefficient of this patent has proved more difficult to calculate than originally anticipated, and the instant invention is directed to a similar dimensionless plot using measured inlet guide vane position as a measure of compressor capacity.

The present invention sets forth a control approach developed to improve the efficiency of a centrifugal chiller using a variable speed impeller motor drive. The control methodology was developed with two objectives in mind. The primary control objective is to modulate the compressor capacity to meet the desired chilled water set point. The second objective is to optimize unit efficiency by operating the compressor impeller at the lowest possible speed, while still achieving the desired load capacity and avoiding surge.

Accordingly, it is a general object of the present invention to provide an improved capacity control system of a centrifugal chiller wherein the compressor speed and guide vane position are adjusted to the most efficient operating point while at the same time avoiding a surge condition.

It is an object of the present invention to provide a variable speed capacity control system for a centrifugal chiller wherein the compressor speed and the inlet guide vane position are modulated to meet the chilled water setpoint of an evaporator.

It is an object of the present invention to provide an improved capacity control system of a centrifugal chiller wherein modulating compressor speed and guide vane position is provided in order to place the compressor operating point on an adaptive or dynamic surge control boundary curve.

It is a further object of the present invention to provide an improved capacity control system of a centrifugal chiller wherein the operating point of the compressor is placed on a non-dimensional map generated from sensed centrifugal chiller values.

It is still a further object of the present invention to provide an improved capacity control system of a centrifugal chiller wherein the position of the surge control boundary curve is updated by the detection of real surge conditions that occur over time and is adjusted in response thereto.

It is still a further object of the present invention to provide an improved capacity control system of a centrifugal chiller which does not measure or record an actual surge curve.

It is an additional object of the present invention to provide an improved capacity control system of a centrifugal chiller which operates to prevent or avoid surge using measurements made in the condenser, the compressor, and evaporator.

It is a further object of the present invention to provide an improved capacity control system of a centrifugal chiller which does not require measurements of actual compressor motor speed or suction flow rate.

SUMMARY OF THE INVENTION

The present invention utilizes readily available parameters sensed in the centrifugal chiller to accurately approximate and generate a dimensionless map that defines the compressor operation. Additionally, actual surge events are detected and used to continually update and define a surge control boundary curve of the compressor. The system defines this surge control boundary curve and movably positions it in relation to detected actual surge events. The system then operates the compressor close to the surge control boundary curve. Location of the surge control boundary curve on the map is updated continuously based upon the detected surges to ensure that the compressor is operating as close as possible to an actual surge condition.

As distinct from previous control systems, the present invention looks at real surge events that occur to the compressor in question as it operates in its unique operating environment and uses those real surge events to move a surge control boundary curve. The surge control boundary curve is a predefined function that is continuously adjusted upon the occurrence of each surge event. An operating curve is defined by the surge control boundary curve and the compressor is operated in that region. The operating curve is positioned to provide the most efficient operation while having a selected probability of avoiding a future surge condition. The actual surge events are continuously monitored to optimize the surge boundary control curve and to reflect changes that occur in the actual surge events over time so that the compressor operation can be brought to its most efficient point of operation close to the real area of surge occurrence. This is a decided advantage for efficient compressor control as compared to the existing schemes.

The invention includes a method for controlling the capacity of a centrifugal compressor. The compressor is driven by an electric motor and has variable inlet guide vanes that control the flow of refrigerant to the compressor. The compressor functions to compress refrigerant for cooling a chilled water supply to a desired temperature. The chilled water is utilized for conditioning the temperature of a space. The controller establishes a dimensionless plot of possible points of compressor operation relating the pressure coefficient and the capacity of the compressor, preferably as determined by inlet guide vane position. The current operating point of the centrifugal compressor is located on the plot based upon continuously monitored or sensed chiller values. A dynamic surge boundary control curve is defined based upon the actual surge occurrences, and control is exercised responsive to the dynamics of the variations of the surge occurrences and the surge boundary control curve for controlling compressor capacity by varying the opening of the inlet guide vanes and varying the speed of the compressor to move the operating point of the compressor proximate the surge boundary control curve while both avoiding surge and maintaining the evaporator chilled water setpoint.

DETAILED DESCRIPTION OF THE DRAWINGS

Figure 1:
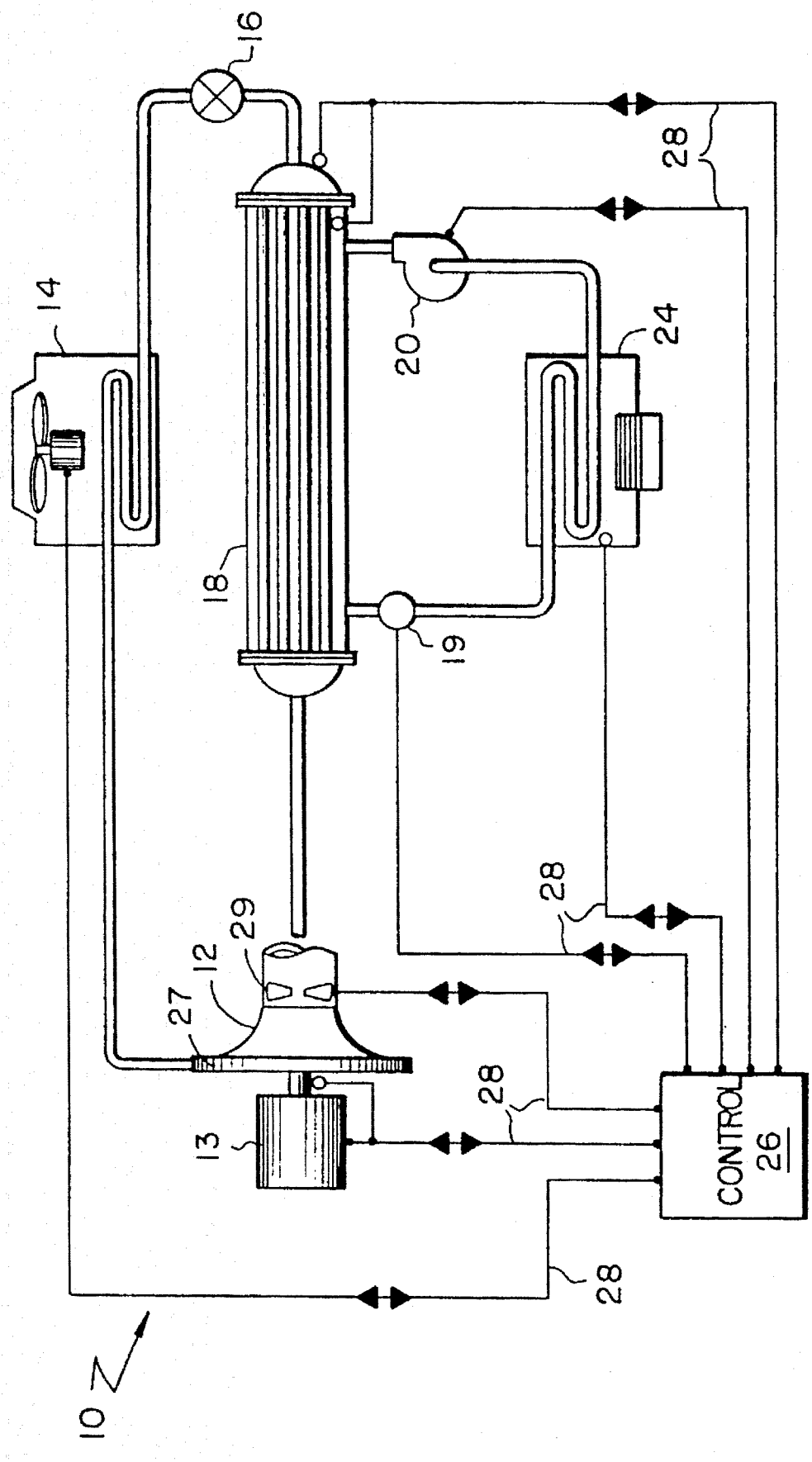
FIG. 1 is a schematic view of an air conditioning system having a control system in accordance with the present invention.

An air conditioning system that incorporates the standard components of a refrigeration loop is shown generally at 10 in FIG. 1. Representative systems are shown in U.S. Pat. No. 4,223,537 to Sanborn et al., U.S. Pat. No. 4,081,971 to Eber, and U.S. Pat. No. 3,853,433 to Roberts et al. These patents are assigned to the assignee of the present invention and are incorporated herein by reference.

The air conditioning system 10 includes a compressor 12 to compress refrigerant vapor. The compressor 12 is typically an electric motor driven unit powered by an induction motor 13. An important characteristic of induction motors is that motor speed can be controlled by varying the frequency of the electric power that is supplied to the motor 13. The compressor 12 compresses and moves pressurized refrigerant vapor to a condenser 14. The condenser 14 is a heat exchanger that extracts heat from the refrigerant vapor and, at the same time, condenses the refrigerant gas to a liquid. The heat extracted from the refrigerant is either directly exhausted to the atmosphere by means of an air cooled condenser, or indirectly exhausted to atmosphere by heat exchange with another water loop and a cooling tower. The pressurized liquid refrigerant passes from the condenser 14 through an expansion device such as an orifice 16 to reduce the pressure of the refrigerant liquid. The refrigerant then flows into the evaporator 18, where the refrigerant performs the cooling function. In the evaporator 18, the refrigerant changes state a second time and evaporates into a vapor. This change of state and any superheating of the refrigerant vapor causes a cooling effect that cools water passing through the evaporator 18. The chilled water is pumped by a pump 20 through a flow switch 19 to an air handling unit 24. Warm air from the space that is being air conditioned is drawn across coils in the air handling unit 24 that contain the chilled water, thereby cooling the air. The cool air is then forced through the air conditioned space, cooling the space.

A controller 26 is in two way communication with various components of the air conditioning system 10 as indicated by communication channels 28 in FIG. 1. These two way communication channels 28 provide sensor data to the controller 26 and permits the controller 26 to send commands to the various components responsive both to external user inputs and to internal sensor data received from sensors located at the various components of air conditioning system 10.

The compressor 12 includes an impeller 27 and inlet guide vanes 29. A centrifugal chiller such as is depicted in FIG. 1 approaches its most efficient operation when the compressor 12 is operating with the variable inlet guide vanes 29 open to a predetermined maximum position, and with the compressor impellers 27 rotating as slow as possible. To achieve this type of operation, a centrifugal chiller is required to perform as close as possible to the undesirable operating condition known as surge. Thus, the control approach comprising this invention is important for several reasons. First, it addresses the difficult task of properly coordinating control of the chiller's inlet guide vanes 29 and impeller rotational speed to match unit load capacity. Second, the control method handles the occurrence and subsequent avoidance of surge in an unique way.

As the rotational speed of a centrifugal compressor impeller 27 decreases, the ability of the compressor 12 to produce a pressure rise from the evaporator 18 to the condenser heat exchanger 14 decreases. The condition known as surge results when this differential pressure is too large for a given rotational speed. The intensity of a surge will vary based on operating conditions and is undesirable for several reasons. One reason surge is undesirable is because of the audible noise it produces in the air conditioning unit. A second reason surge is undesirable is because it produces rapid operating changes in the unit. These rapid changes cause a loss of control performance and the potential for unit shut down due to exceeding limit controls. Limit controls are set system parameters which, when exceeded, causes the air conditioning system to shut down. One approach to avoiding surge is described in U.S. Pat. No. 4,686,834 to Haley et al. This patent is assigned to the assignee of the present invention and is incorporated herein by reference.

Figure 2:
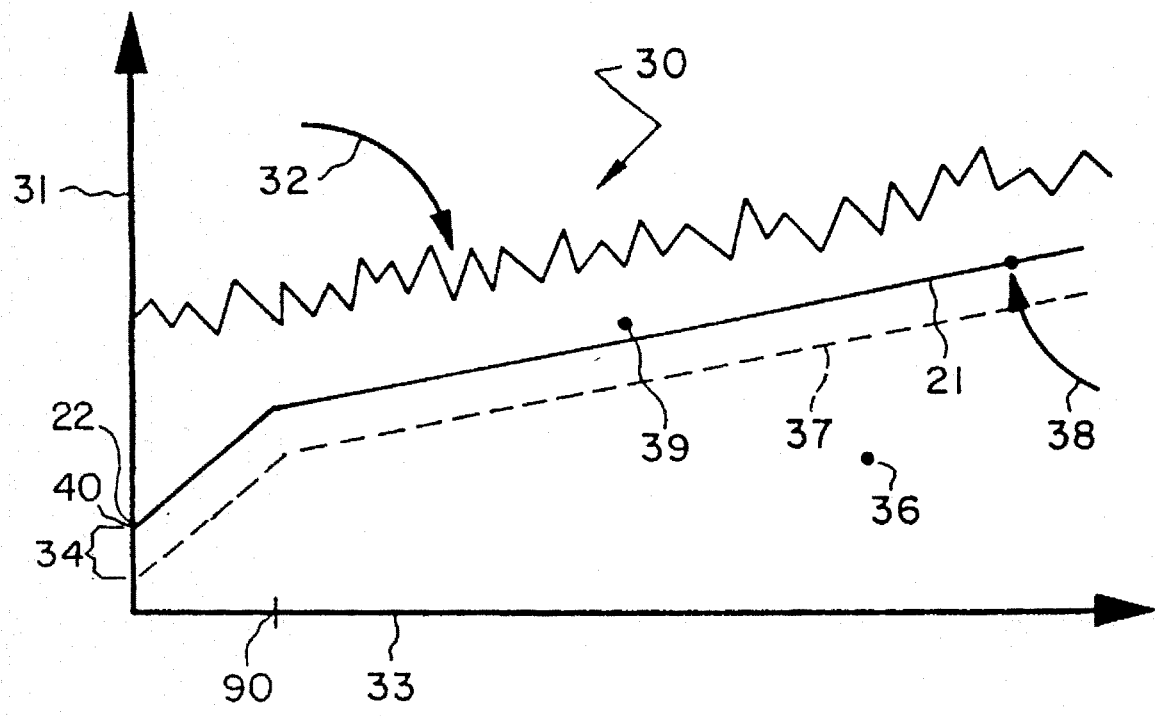
FIG. 2 is a dimensionless plot of the air conditioning system compressor operation as indicated by the relation of the inlet guide vane position to the pressure coefficient.

The equations developed in accordance with the present invention for impeller speed control and surge avoidance are based on continuously locating a compressor operating point 36 on a non-dimensional compressor map 30, as depicted in FIG. 2. The non-dimensional compressor map 30 is represented by a plot of a compressor pressure coefficient value 31 versus a compressor capacity value 33 calculated from sensor data taken every Leaving Water Temperature sample period. Preferably, this sample period is as short as possible. Typically, a chiller system may operate with a five second sample period. However, this can be modified as desired. The compressor capacity value 33 is a measurement of the cooling capacity of the air conditioning system 10 preferably based upon measured inlet guide vane position 29. The compressor pressure value 31 is a measurement of energy added to the refrigerant by the compressor 12 as the compressor 12 compresses the refrigerant gas.

These non-dimensional values take into account the relationship of impeller rotational speed on pressure rise and capacity as shown below. The compressor capacity is considered the independent variable and is determined based upon the measured inlet guide vane position. The chiller pressure coefficient (PC) is determined in accordance with the present invention as follows:

$$PC = \frac{(1.3159e9)\,(\text{Delta H isentropic})}{(\text{Numstages})\,(\text{Dia}^2)\,(N^2)} \quad (1)$$

Where:

N=Rotational speed of the impellers in RPM as calculated from commanded inverter frequency neglecting motor slip. Neglecting motor slip is a reasonable approximation for low slip motors. It should be noted that the present invention does not measure actual motor speed.

Dia=Average Impeller Diameter.

Numstages=Number of compression stages in the chiller.

Delta H isentropic=isentropic enthalpy rise, using the evaporator pressure and temperature and condenser pressure to calculate the enthalpy rise across the compressor.

Since the number of stages (numstages), the value (1.359E9), and the impeller diameter (Dia) are a constant (c) for any particular compressor, the calculation of the chiller pressure coefficient (PC) reduces to:

$$PC = \frac{(c)\,\text{Delta H isentropic}}{N^2}$$

In the non-dimensional compressor map 30, the compressor pressure coefficient is represented as the ordinate or Y-axis 31 and the compressor capacity is represented as the abscissa or X-axis 33.

A compressor operating point, shown for example at 36, is calculated from sensor data every leaving water temperature (LWT) sample period. The compressor operating point 36 is a representation of the actual point of operation of the compressor 12 at the particular time that the sensor data is taken. The compressor operating point 36 is compared to the value of surge boundary control curve 38. The surge boundary control curve 38 is a calculated operating limit that is positioned proximate to a region 32 of actual surge as detected by intermittent surge events. The Y-intercept 22 of the surge boundary control curve 38 is selected by the user. Since the user selects the Y-intercept 22 of the surge boundary control curve 38, the user can define how aggressively to pursue energy efficiency. By making the Y-intercept 22 of the surge boundary control curve 38 close to the region 32 of actual surge, the most energy efficient operation can be achieved but at the risk of increased incidences of surge as the surge boundary control curve 38 approaches the region 32 of actual surge. The Y-intercept 22 can be set at considerable distance from the region 32 of actual surge to decrease the risk of surge by separating the surge boundary control curve 38 from the region 32 of actual surge. However, this is a trade off since the chiller system will expend more energy in its operation and thus not operate in the most optimal energy efficient operation.

It is the function of the control system to drive chiller operation as close to the region 32 of actual surge as possible without surging. In this pursuit, the compressor operating point 36 is typically located in the region between the surge boundary control curve 38 and a lower limit 37 of a pressure error deadband 34. The compressor operating point 36 is calculated from sensor data every LWT sample period. Information from this mapping is used in the adjustment of the inlet guide vane and impeller control settings, as well as the surge curve adjustment control as will subsequently be described.

During operation of air conditioning system 10, two very distinct control operating modes exist pursuant to the invention. In one operating mode, compressor capacity modulation is based on modulating inlet guide vane position. This mode is referred to in FIG. 3 as GVMODE=1. In GVMODE =1, capacity control is achieved by varying inlet guide vane position and, under certain circumstances, by varying impeller speed. In the second operating mode, compressor capacity modulation is achieved by modulating impeller speed only. This mode is referred to as GVMODE=0. Operation in the GVMODE=0 mode occurs once the inlet guide vanes 29 have reached a predetermined open position and the LWT is determined to be in a steady state operating condition.

At air conditioning system start up, the operating mode is GVMODE=1 and the compressor impeller 27 rotates at full speed (i.e. the speed that is possible at normal power line frequency of 60 HZ). A conventional Leaving Water Temperature (LWT) control mode modulates inlet guide vane position and hence unit capacity to bring the Leaving Water Temperature within a deadband about a set-point. The set-point is an input by the air conditioning system user and may be varied as desired. It takes a certain period of time after start up for the leaving water to attain the desired setpoint temperature. During this period of time following start up, the LWT is sampled frequently in order to bring the centrifugal chiller to a point where the LWT is at a steady state about the set point. In the preferred embodiment, this sampling occurs every five seconds until the steady state condition is achieved.

To determine if the Leaving Water Temperature is in steady-state, a standard deviation in Leaving Water Temperature about the chilled water set point is computed over a moving, fixed point, time window. Once the standard-deviation in LWT about the chilled water set point is lower than a user specified deviation for a specified time period, the Leaving Water Temperature is assumed to be in a steady-state condition about the setpoint.

As long as the LWT steady-state evaluation is true, e.g. sensed to be within the selected deviation allowed, a slower background speed control (BSC) loop, with a sample period of 5 minutes is executed. An attempt to reduce impeller speed by reducing the frequency of the power to the compressor motor 13 is made each time the slower control loop is executed. This control loop acts on the deadband error, DBerr. The deadband error is equal to the compressor operating point, exemplary shown at 36, minus the surge control boundary curve, depicted at 38 plus the user set pressure deadband value. A compressor speed change is computed proportional to the deadband error. During operation, if the compressor operating point 36 of the compressor lies below the lower limit of the pressure dead band 37, a compressor speed decrease may be commanded in order to bring the compressor operating point 36 into the pressure error deadband 34. Every time the slow control loop requests an impeller speed decrease, the inlet guide vanes 29 open further by closed loop control action to compensate for the decrease in unit capacity that occurs by reducing impeller speed. By decreasing impeller speed, unit efficiency is increased and the compressor operating point 36 moves closer to the pressure error dead band 34.

After a number of impeller speed decreases have occurred and if sufficient cooling load exists, the inlet guide vanes 29 will be driven to the predetermined maximum open condition to compensate for the successive impeller speed reductions. When the inlet guide vanes 29 reach the maximum open condition and the Leaving Water Temperature is in steady-state, a test is conducted to see if the vanes are commanded to stay at maximum for three consecutive sample periods (a total of 15 sec). If this test is found to be true, control will transition into the second operating mode identified as GVMODE=0. Alternatively, fuzzy logic or the like could be used to determine when the transitions between the first and second operating modes occur.

In the GVMODE=0 operating mode, compressor capacity is modulated by modulating only impeller speed which in turn is achieved by controlling the frequency of the power to the compressor motor 13. Like the GVMODE=1 operating mode, capacity modulation is based on the deviation in LWT from a user specified set point. This control mode uses the same LWT control output as in GVMODE=1 with an appropriate scaling factor. The scale factor makes the resulting capacity change due to an incremental change in impeller speed match the resulting capacity change that would occur from a certain discrete change in inlet guide vane position.

One key requirement to providing acceptable control performance in this mode is the ability to match load capacity requirements. This means the inverter that provides the power to the impeller motor 13 must provide appropriate speed resolution to permit continuously variable capacity generation capable of matching load capacity by impeller speed modulation. The fall back position in the event that impeller speed modulation does not adequately match the load capacity of the air conditioning system 10 is to return to capacity control by means of the control mode GVMODE=1. Accordingly, three conditions will cause immediate transition from the GVMODE=0 operating mode back to the GVMODE=1 operating mode. These conditions are:

a) Detecting a forced unload limit. There are a number of air conditioning system limits that are continually monitored. Such limits are for example, condenser 14 pressure too high, motor 13 current too high, and evaporator 18 refrigerant temperature too low. If any of these or other protective limits are exceeded, a decrease in centrifugal compressor 12 output is required to alleviate the limit condition.

b) Modulating lower than 0.6 HZ below HZ Trans.

c) Detecting a surge. This means that an actual surge event has occurred which, in the present invention, is detected by monitoring motor current.

Any time a limit requiring forced unloading is detected, the limit is exercised by increasing the angle of the variable inlet guide vanes with respect to the direction of refrigerant flow. The detection of a surge event based upon monitored motor current increases the impeller speed by 2 HZ to terminate the present surge condition. The detection of surge event will modify either or both of the slope or the formula of the surge boundary control curve 38. The inlet guide vanes 29 will be adjusted to a new position determined by the LWT error.

The region 32 of actual surge may vary from chiller to chiller even though the chillers are nominally identical. Additionally, the region 32 of actual surge for a given compressor 12 is affected by the specific operating environment that the air conditioning system 10 is installed in. Under these conditions, it is desirable that the control method be designed to continually adjust the surge boundary control curve 38 to provide the highest possible efficiency for a given chiller and its present operating condition. In the present invention this is accomplished by initially setting the surge boundary control curve 38, conservatively (i.e. considerably lower than the region 32 of actual surge) on the non-dimensional compressor map upon very first startup or after power loss to the control module. Otherwise the system will start with the curve 38 with the Y-intercept value established when the system was last turned, since the default intercept 22 is set conservatively, a condition may exist in which the pressure coefficient is greater than the surge boundary control curve 38 at start up when the commanded motor speed is typically at 60 Hertz. To avoid such a state, three conditions that may increase the intercept 22 are checked beginning some minutes (typically ten) after start to provide zero pressure error. The required conditions are that the pressure coefficient be greater than the surge boundary control curve 38, that the commanded motor speed be at maximum, and that the inlet guide vane position be greater than a predetermined minimum position such as 12.5 percent as indicated by point 90 of FIG. 2. The position of point 90 on the X axis 33 is determined as a percentage of inlet guide vane position. If the X axis position is less than 12.5 percent as represented by point 90 then the surge boundary control curve 30 is determined using the formula 1.8848 times the X axis position) plus the Y intercept 22 minus 0.22. Otherwise the surge boundary control curve 38 is set using the formula (0.125 times the X axis position) plus the Y intercept 22 shown by the surge boundary control curve 38 in FIG. 2.

After air conditioning system 10 start up and stabilization, the control system will try to decrease impeller speed to increase efficiency and move the compressor operating point 36 closer to the surge boundary control curve 38 as previously discussed. Once the compressor operating point 36 falls within the pressure error deadband 34, no further impeller speed reductions are allowed. However, if the unit reaches this point and no surge condition exists and the unit's LWT is in steady-state, the y-intercept 22 of the surge boundary control curve 38 is raised by a discrete amount. This action allows a pressure error to form (hence deadband) again by raising the surge boundary control curve 38 above compressor operating point 36 allowing further speed reductions to occur to continue to optimize unit efficiency. This process will continue until the surge boundary control curve 38 is raised up to the point at which the compressor operating point 36 enters into a region 32 of actual surge.

Surge detection logic preferably monitors the peak rectified and filtered values of one of the impeller motor 13 phase currents (formed by a hardware circuit) to determine a change that correlates to an audible surge occurrence. Motor phase current changes dramatically in response to a surge condition. In the preferred embodiment, five surge occurrences in one minute denote a surge event, but a person of skill in the art will recognize that surge events can be defined in many other ways as is well known in the art. If a surge event is established, the speed of motor 13 is increased by 2 HZ to terminate the present surge. Such detection of phase current or phase change is well known in the art as shown, for example, by U.S. Pat. Nos. 5,058,031 and 5,056,032 to Swanson et al. Each of these patents is assigned to the assignee of the present invention and each is hereby incorporated by reference.

In addition to the above speed increase, the y-intercept 22 of the surge boundary control curve 38 is decreased by a discrete amount to prevent a surge at similar conditions in the future. Any time the surge boundary control curve 38 is lowered, a surge boundary control reset flag is set which will not allow the surge boundary control curve 38 to be raised again until either of two conditions are satisfied. These two conditions are: (1) exceeding a user specified aggressiveness factor or (2) exceeding a user specified time.

With regard to the aggressiveness factor, the curve 38 will not be reset until the absolute value of deadband error of the air conditioning system 10 exceeds a user specified magnitude (the efficiency aggressiveness factor) greater than the boundary pressure error deadband 34 magnitude. This allows continued operation at the air conditioning system 10 self optimized operating condition while allowing further efficiency improvements to occur if a large enough change in load or operating conditions cause the deadband error of the air conditioning system 10 to become larger than the user specified efficiency aggressiveness factor.

With regard to the user specified time, the present invention also contemplates that the surge boundary control reset flag can be cleared using a time based approach. As soon as this surge boundary control reset flag is set, a re-optimization timer begins to count down from a user specified amount of hours ranging from 1 to 255. This user specified amount of time, which defaults to 24 hours if unspecified, determines how aggressively the chiller will try and re-optimize efficiency. A short time period will allow the chiller to raise the surge boundary control curve 38 within a short period of time, whereas a long time period will prevent the surge boundary control curve from being raised until that long time period expires.

Figure 3:
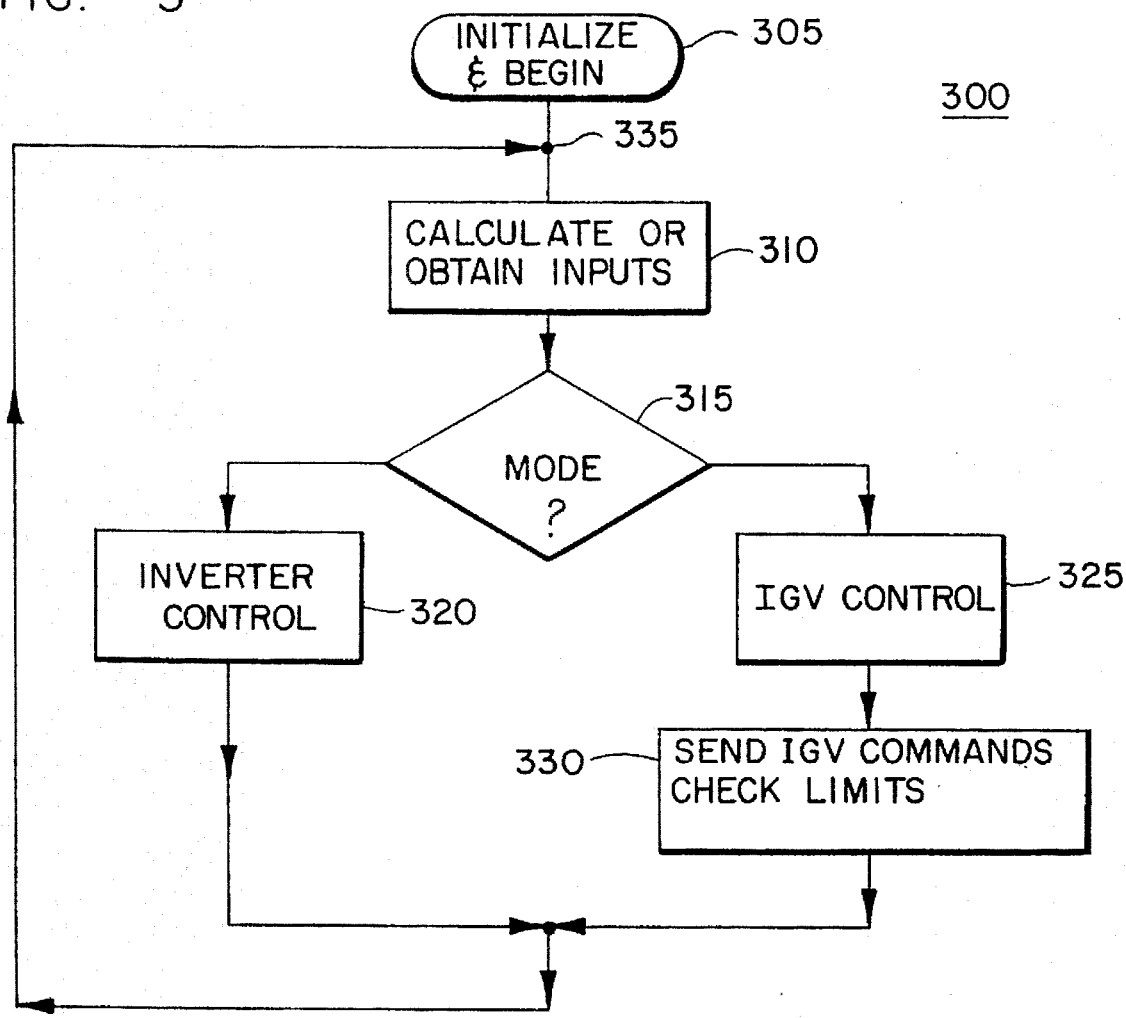
FIGS. 3 is a flow chart depicting the control method of the present invention.

FIG. 3 shows a flow chart of the overall operation of the control system of the present invention. The flow chart 300 commences at step 305 by initializing the mode of operation to the guide vane modulating mode and by initializing the commanded motor speed to be 60 HZ. The inlet guide vanes 29 are preferably positioned by a stepper motor. In the preferred embodiment, there are approximately 50,000 steps between the fully closed and the fully opened positions of the inlet guide vanes 29. The predetermined maximum open position for the inlet guide vanes 29 is referred to as ABSMAX. Typically, in the maximum position the inlet guide vanes 29 will be aligned with or nearly aligned with the refrigerant flow stream into the impeller. The motor 13 in the initial condition is running at full speed generally corresponding to an input to the motor 13 of the full line frequency of 60 HZ.

At 310 evaporator leaving water temperature inputs are received from a conventional evaporator leaving water temperature controller and inputs are received from a limit arbitrator which generally sets a limit flag (limit flag) to indicate whether a system limit such as high pressure or low pressure has been violated. The limit arbitrator also passes along an inlet guide vane position change value (DS LIM), this value representing the direction and smallest amount of change requested by the combination of the evaporator leaving water temperature controller and the limit arbitrator.

Leaving water temperature (LWT) is the temperature of the chilled water as it leaves the evaporator 18. This water actually cools the space being conditioned by the air conditioning system. In a leaving water temperature (LWT) controlled air conditioning system 10, a deadband of small deviation is established about user selected setpoint. If the LWT is within the deadband, the LWT is assumed to be in control. The pressure coefficient is calculated per the previously described equation 1. Referring to FIG. 2, the compressor operating point is shown at 36 and is an indication of the current operating condition of the air conditioning system 10. Additionally, the X axis position, or compressor capacity value 33, is calculated as a percentage of inlet guide vane position. If the compressor capacity value 33 is less than 12.5 percent, a startup condition may exist so that the surge boundary control curve 38 is set equal to (0.8848)(X axis) plus the Y-intercept 22 minus 0.22. Otherwise, the surge boundary control curve 38 is set equal to (0.125) (X axis) plus the Y-intercept 22.

In step 310, Delta Hertz is set equal to zero, Delta Hertz being a command for a change in the frequency of the power that is supplied to the motor 13 driving the impeller, preferably by means of an inverter. Finally, step 310 calculates the deadband error and the pressure error deadband 34.

At step 315, after finishing with block 310, the mode of operation is determined to be either inverter modulating mode of control or inlet guide vane modulating mode of control by checking a flag GMMODE.

The inverter control modulating mode is illustrated by block 320 and is subsequently described with respect to FIG. 4. The inlet guide vane control mode is illustrated by block 325 and is subsequently described with respect to FIGS. 5 and 6. Once the inlet guide vane modulating mode of control at step 325 is accomplished, commands to modulate the inlet guide vane are issued at step 330, the commanded motor speed (HZ) is set as the previous commanded motor speed (Old HZ) plus the desired change in motor speed (Delta Hertz), and the commanded motor speed is then bounded to be between 42.0 and 60.0 Hertz. Additionally, a value, transition Hertz (THZ), subsequently used in step 382 is set as THZ=HZ–0.6 so as to ensure that the IGV mode is initiated if motor speed is modulated too low. A check is made to ensure that the transition hertz does not fall below a predetermined lower limit (preferably 42.0 hertz) and that the Y-intercept 22 does not exceed a predetermined maximum.

After either step 320 or steps 325 and 330 are executed, the loop is re-commenced at step 335. Various timers such as the BSC timer will provide real time delays so that the controller sees the effect of a command before issuing additional commands.

Figure 4:
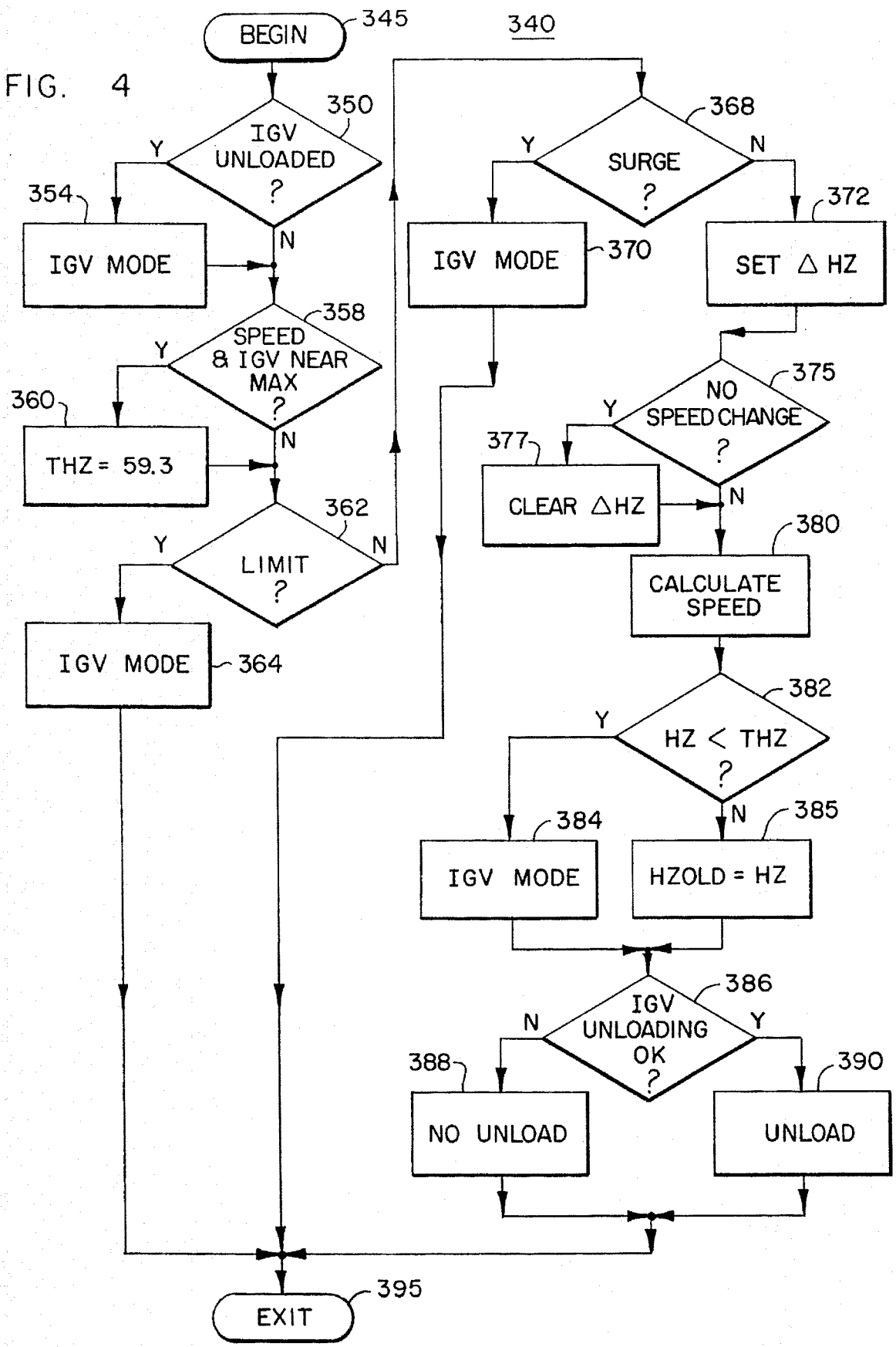
FIG. 4 is a flow chart depicting the inverter modulating mode of FIG. 3.

If the mode of operation has been determined to be inverter control, the flow chart 340 shown in FIG. 4 is commenced at step 345. Although the inverter modulating mode primarily modulates the motor speed while holding the inlet guide vanes 29 at a maximum position, under certain conditions subsequently described in step 390, the inlet guide vane positions may decrease while in the inverter modulating mode. At step 350 a check is made to determine whether the inlet guide vane position is less than 70 percent of ABSMAX. ABSMAX is the maximum allowable inlet guide van position. This effectively determines if the inlet guide vane position has been unloaded too far to remain in the inverter modulating mode. If the inlet guide vane position is less than 70% of ABSMAX, then step 354 is implemented to terminate the inverter modulating mode and reinitiate the inlet guide vane modulating mode described subsequently with respect to FIGS. 5 and 6. This is accomplished by setting the GVMODE flag to indicate that the IGV modulating mode should be selected at step 315. Also, a no speed decrease flag (NSD) is set, the background speed control (BSC) timer is set, and an open count is equal to minus three. From either of steps 350 or 354, step 358 will then be initiated.

Step 358 is intended to expedite the smooth transition from the inverter modulating mode to the inlet guide vane modulating mode under a specific condition. If the inlet guide vane position is within 3000 steps of ABSMAX and the commanded motor speed (HZOLD) is greater than or equal to 60 Hertz, the transition hertz (THZ) value is overridden and set equal to 59.3. The value is overridden to provide a real time delay before the inverter modulating mode of operation can again be initiated after switching from the inverter modulating mode to the inlet guide vane mode of operation. This is accomplished at step 360. Both step 360 and 358 lead to step 362.

At step 362 the limit flag set by the limit arbitrator back in step 310 is checked and the size of the commanded step change (DS LIM) is checked to see if it is less than zero. If a limit violation has occurred and the step change is less than zero, then step 364 is immediately implemented to return the mode of operation to inlet guide vane control by setting the GVMODE flag appropriately. The background speed count BSC is set at five minutes and the open count is set at minus three also. After implementing step 364 the flow chart 340 is exited at 395.

If step 362 found no limit violation, then a check is made at step 368 to see if a surge event has been detected. If a surge event has been detected, step 370 is immediately executed to return to the inlet guide vane mode of operation by setting the GVMODE flag appropriately. Additionally, the background speed count BSC is set to five minutes and the open count is set to minus three. A surge ignore timer is set to zero and the routine is then exited at step 395.

If no surge was detected at step 368, then at step 372 the Delta Hertz is set equal to the DS LIM position change requested at step 310 by the limit arbitrator and LWT controller.

Next, at step 375, a check is made to see if the Delta Hertz is less than zero and the NSD no speed decrease flag has been set. If so, then the commanded decrease by a Delta Hertz of less than zero is reset at step 377 to zero. Both steps 377 and 375 lead to step 380 where the actual speed (HZ) of the inverter is determined by calculating.

Delta Hertz=(Delta Hertz times 0.0003) plus HZOLD, with a 60.0 Hertz upper limit and a 42.0 Hertz lower limit.

At step 382 a check is made to see if the speed (HZ) is less than transition Hertz (THZ). If so, step 384 is executed to return the mode of operation to inlet guide vane control by setting the GVMODE flag to so indicate. Additionally at step 384 the no speed decrease flag is set, HZOLD is set equal to the transition Hertz value, the surge ignore timer is set equal to zero, the open count is set equal to minus three and the background speed counter BSC is set equal to five minutes. However, if the commanded motor speed is greater than the transition Hertz at step 382 then the commanded motor speed is saved as HZOLD at step 385. Both steps 385 and 384 lead to step 386 where a check for a special case is made.

At step 386, if the no speed decrease flag is set equal to one and the limit arbitrator at step 310 has requested a DS LIM of less than zero then unloading is allowed to occur at step 390 by sending the inlet guide vane unloading command. If this special case is not met in step 386, then delta steps is cleared at step 388 and the routine is exited at step 390.

Figure 5:
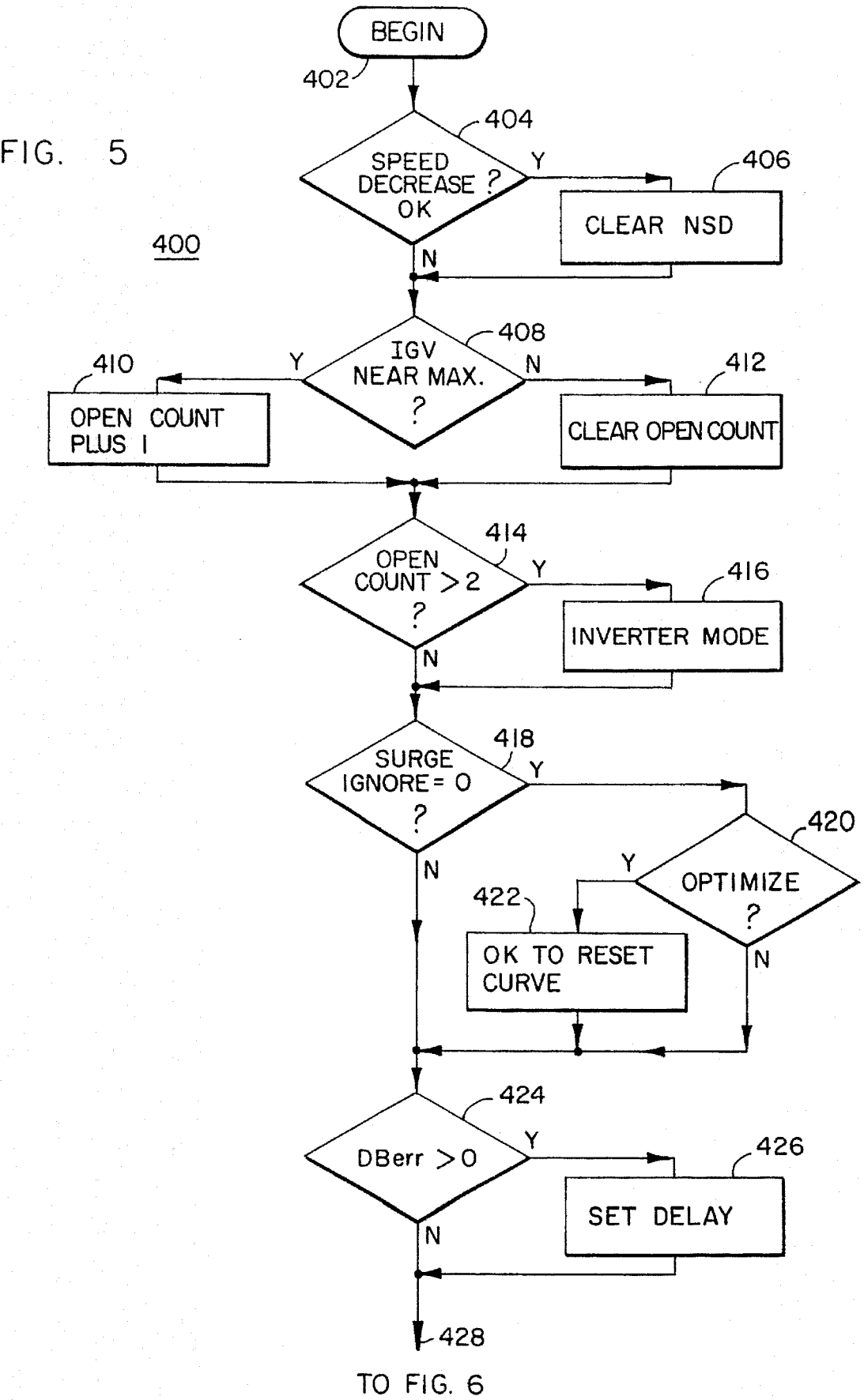
FIGS. 5 and 6 are a flow chart depicting the inlet guide vane modulating mode of FIG. 3.
Figure 6:
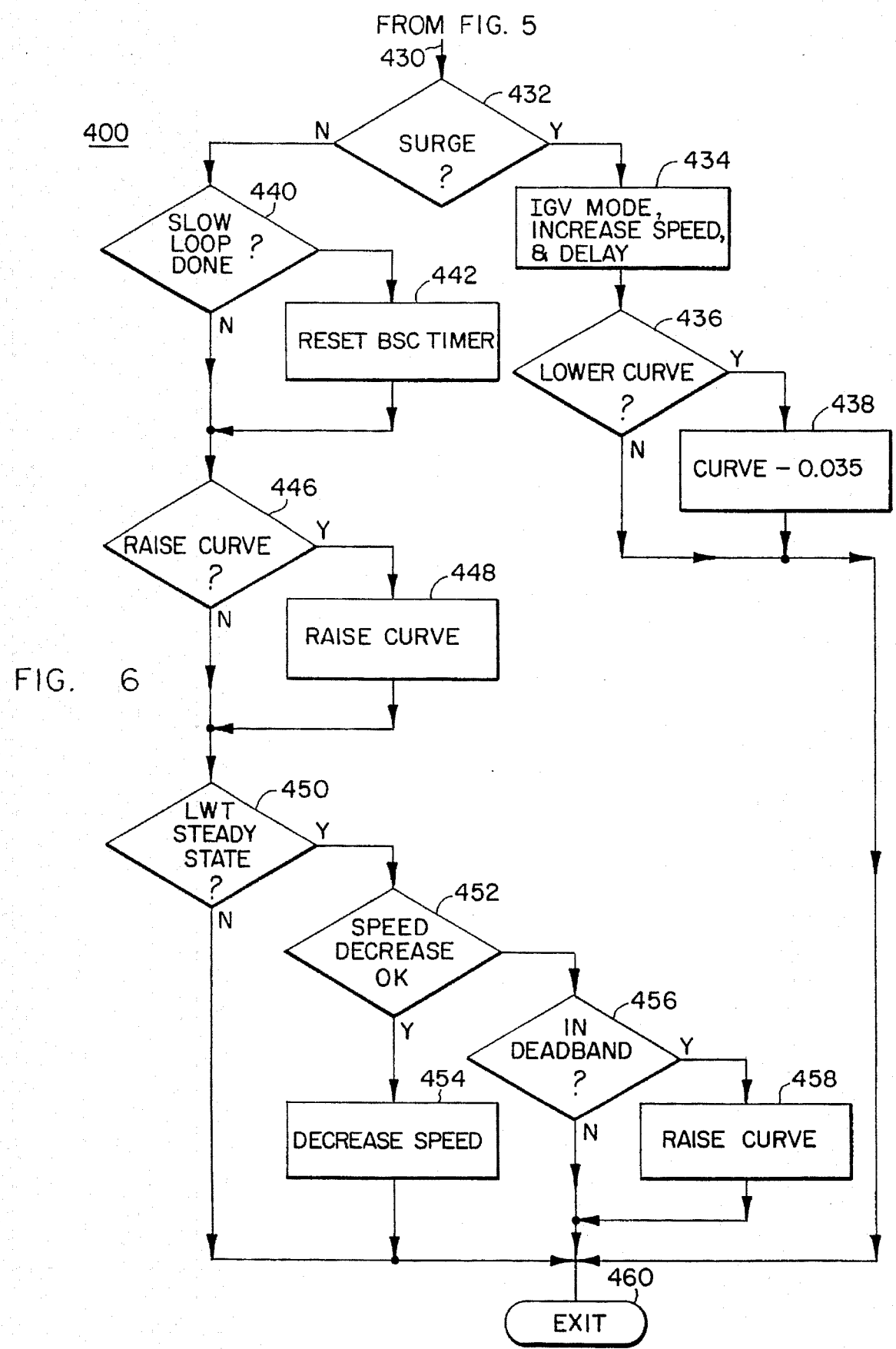

FIGS. 5 and 6 show a flow chart 400 which illustrates the IGV modulating mode of control of step 325. The flow chart 400 begins at step 402 and initially checks at step 404 to determine if the inlet guide vanes are less than 70 percent of ABSMAX. If they are, the no speed decrease (NSD) flag is cleared at step 406. Both steps 404 and 406 lead to step 408. Steps 408, 410, 414 and 416 are a series of steps that allow the only transition into the inverter modulating mode shown in FIG. 4. At step 408 a check is made to see if the inlet guide vane position is within 3000 steps of ABSMAX. If so, then the open count is incremented by one at step 410. Otherwise, the open count is cleared at step 412. The open count is immediately checked at step 414 to determine if it was greater than two and if the commanded motor speed HZOLD is less than 60 Hertz. If both of these conditions are true then the transition to inverter modulating mode is made at step 416 by setting the GVMODE flag to so indicate. Both steps 414 and 416 lead to step 418.

At step 418 a surge ignore timer is determined to be zero. This timer basically provides a three minute waiting period after a surge has been detected and after an initial speed increase has been commanded to the motor. If the surge ignore timer is determined at step 414 to have reached zero, then step 420 is executed. If either the absolute value of the pressure error deadband is greater than a user selected aggressiveness reset factor or if a re-optimization timer has reached zero, step 422 can be executed and the optimization of the system continued by moving the surge boundary control curve 38 closer to the region 32 of actual surge. The check at step 420 prevents resetting the surge boundary control curve 38 upwardly until the pressure error has varied by that user selected amount or the re-optimization timer has counted down from the one through 255 hour time period selected by the user. When this occurs the no surge curve reset flag (NSCR) is cleared at step 422. All of steps 418, 420 and 422 lead to step 424.

At step 424 the pressure error deadband (DBerr) is checked to verify if it is greater than zero and a speed increase delay timer is checked to see that it is zero. If both conditions are true then step 426 is executed to provide increased motor speed to force the compressor operating point 36 back into the deadband 34. This real time control is provided by setting a speed increase delay (SID) timer to thirty seconds, the open count to zero, and setting:

Delta Hertz=(0.5) (speed gain) (pressure deadband), and by bounding Delta Hertz between an upper limit of 2.0 Hertz and a lower limit of 0.0 Hertz.

Arrow 428 indicates the transition to FIG. 6 from FIG. 5 and arrow 430 indicates the transition on FIG. 6 from FIG. 5.

Next at step 432 a check is made to see if a surge event has occurred. If so, at step 434, the mode of operation is again commanded to be the inlet guide vane modulating mode, the re-optimization timer is set to a user determined setpoint of between 1 and 255 hours and a speed change is commanded by setting Delta Hertz equal to 2.0. The surge ignore timer is set to be three minutes and the background speed count BSC is set to be five minutes.

After the speed is increased by setting Delta Hertz equal to 2.0 to avoid surge, the SID timer is set to five minutes so that the effect of the commanded change in motor speed can be evaluated. Additionally the no surge curve reset NSCR flag is set to prevent any raising of the surge boundary curve.

After step 434, a check is made at step 436 to determine if the surge boundary control curve 38 can be lowered. If the commanded motor speed HZOLD is less than 60 Hertz and the boundary pressure coefficient is greater than 0.035, the curve is lowered at step 438 by setting the boundary Y-intercept 22 to be equal to the Y-intercept minus 0.035. If possible, the surge boundary control curve 38 is always lowered if there is a surge. Both steps 436 and 438 are completed by exiting the flow chart 400 at step 460.

If the surge was not detected back at step 432 then the background speed counter BSC is checked at step 440 to determine if it has reached zero. If so it is reset at step 442 to be five minutes. Both steps 440 and 442 lead to step 446 where a check is made to see if the surge boundary control curve 38 can be raised. The commanded motor speed HZOLD is checked to see if it was greater than 60 Hertz, the deadband error is checked to be greater than zero and the X axis is verified to be greater than 0.125. If all these conditions are true, the curve is moved up at step 448 by setting the boundary pressure coefficient Y-intercept equal to the pressure coefficient minus (0.125 times the X axis). Both steps 446 and steps 448 lead to step 450.

At step 450 a check is made to see if the leaving water temperature is in a steady state condition. If not the routine is exited at step 460. However, if the leaving water temperature is in a steady state condition a check is made to see if a speed decrease can be accomplished at step 452.

At step 452 the deadband error is verified to be less than zero and the no speed decrease flag is checked to make sure that it has not been set. If both conditions are true step 454 is implemented to implement a speed decrease. The change in motor speed Delta Hertz is set to be the speed gain times the pressure deadband bounded by an upper limit of 0.0 Hertz and a lower limit of minus 2.0 Hertz. The routine is then exited at step 460.

If a speed decrease cannot be made at step 452, a further check is made at step 456 to see if the surge boundary control curve 38 can be raised. If the compressor operating point 36 is in the deadband as determined by pressure deadband error equals zero and the NSCR flag is zero, then the curve can be raised at step 58, otherwise the routine is exited at 460. At step 458 the curve is raised by setting the Y-intercept to be equal to the Y-intercept plus 0.2. The routine is then exited at step 460.

Although the present invention is described with respect to the preferred embodiment, modification thereof will become apparent to those skilled in the art. For example, although the present invention describes the detection of surges based upon monitored motor current, other ways of detecting surge are known (including pressure or noise monitoring) and all such ways are contemplated. Therefore, the scope of the invention is to be determined by reference to the claims which follow.

We claim:

1. A method of controlling the operation of a centrifugal compressor in a water chiller system, the compressor's capacity being variable by modulating its speed of rotation or by modulating its inlet guide vane's position, the water chiller including an evaporator having a leaving water temperature, the method comprising the steps of:

monitoring the leaving water temperature;

determining if the leaving water temperature is in a steady state;

modulating the compressor capacity by modulating speed of rotation if the leaving water temperature is in a steady state; and modulating the compressor capacity by modulating inlet guide vane position if the leaving water temperature is not in a steady state.

2. The method of claim 1 wherein the speed modulating step includes the further step of maintaining the position of the inlet guide vanes at a substantially maximum position.

3. The method of claim 2 wherein the inlet guide vane modulating step is implemented when initially starting the compressor.

4. The method of claim 3 wherein the speed modulating step cannot be initiated unless the inlet guide vanes have been at the substantially maximum position for a predetermined time period and the leaving water temperature has been at steady state of a second predetermined time period.

5. The method of claim 4 wherein the substantially maximum position is either 70% of the maximum position or within about 3000 steps of the maximum position.

* * * * *